F. L. SESSIONS.
METHOD OF AND APPARATUS FOR ELECTRIC WELDING.
APPLICATION FILED SEPT. 27, 1919. RENEWED JUNE 9, 1920.

1,365,199.

Patented Jan. 11, 1921.
4 SHEETS—SHEET 1.

Inventor:
Frank L. Sessions

F. L. SESSIONS.
METHOD OF AND APPARATUS FOR ELECTRIC WELDING.
APPLICATION FILED SEPT. 27, 1919. RENEWED JUNE 9, 1920.

1,365,199.

Patented Jan. 11, 1921.
4 SHEETS—SHEET 2.

Inventor:
Frank L. Sessions

F. L. SESSIONS.
METHOD OF AND APPARATUS FOR ELECTRIC WELDING.
APPLICATION FILED SEPT. 27, 1919. RENEWED JUNE 9, 1920.

1,365,199.

Patented Jan. 11, 1921.
4 SHEETS—SHEET 3.

Inventor:
Frank L. Sessions

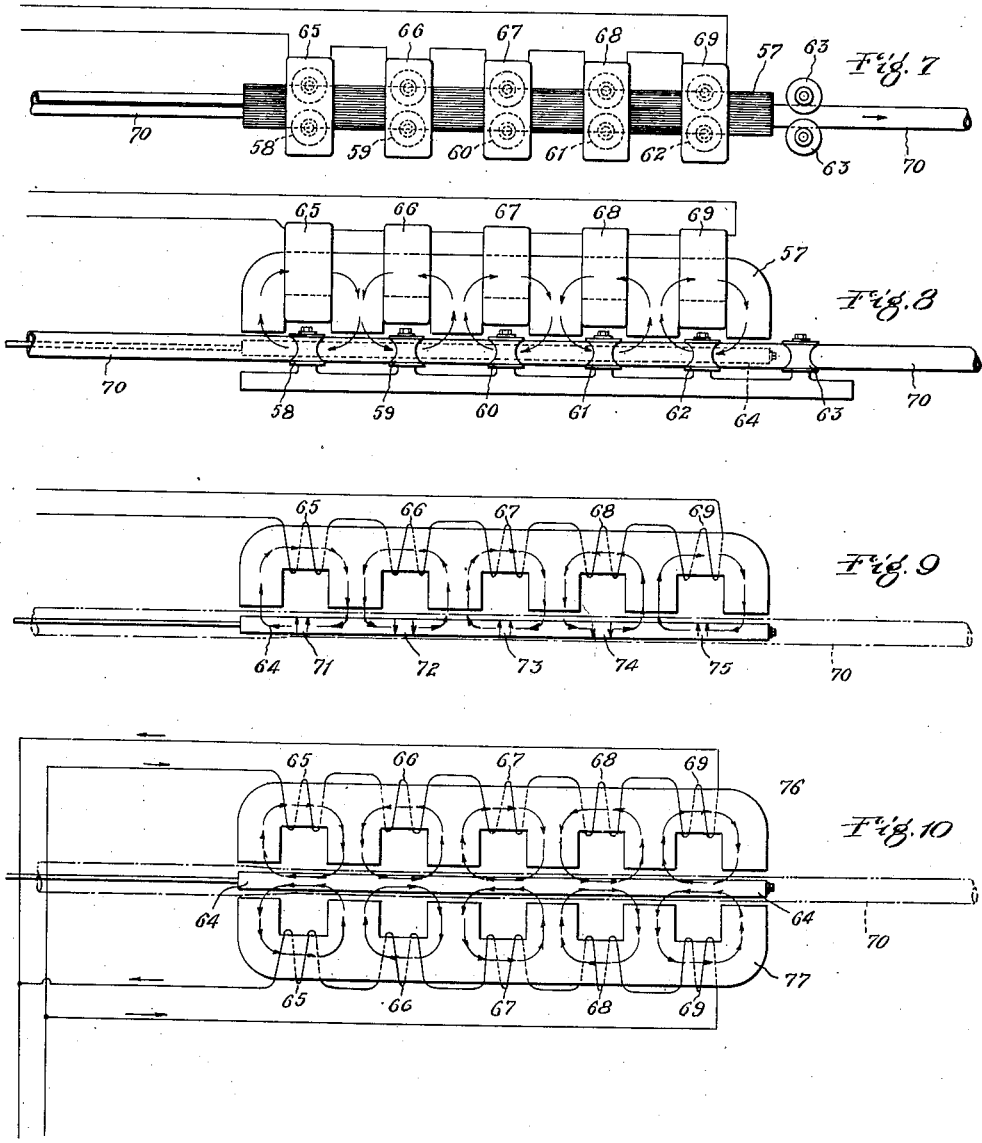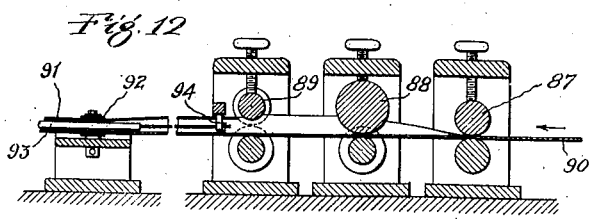

UNITED STATES PATENT OFFICE.

FRANK L. SESSIONS, OF LAKEWOOD, OHIO.

METHOD OF AND APPARATUS FOR ELECTRIC WELDING.

1,365,199. Specification of Letters Patent. Patented Jan. 11, 1921.

Application filed September 27, 1919, Serial No. 326,774. Renewed June 9, 1920. Serial No. 387,780.

*To all whom it may concern:*

Be it known that I, FRANK L. SESSIONS, a citizen of the United States, residing at Lakewood, in the county of Cuyahoga and State of Ohio, have invented certain new and useful Improvements in Methods of and Apparatus for Electric Welding, of which the following is a specification.

My invention relates to a method of and apparatus for electrically welding lap-seam or close-butted-seam tubing to make what is known as electrically welded seamless tubing. More specifically, it relates to a method of and apparatus for welding the seam of a preformed open-seam tube by electric currents induced in and made to flow circumferentially around through the metal and across the lap-seam or close-butted seam of said tubing by means of an alternating magnetic field of force or a plurality of alternating magnetic fields, the magnetic lines of which pass through the walls of the tubing and flow in an axial direction through the space inclosed by the tubing. The alternating lines of magnetic force are set up by suitably disposed electric coils connected to alternating electric current circuits.

The broad principle of my invention is disclosed in my application, Serial No. 284,652, filed March 24, 1919. The present invention is an improvement of the invention disclosed in the aforesaid application.

The object of my invention is the provision of a new and useful method and apparatus for applying the principles employed in welding tubing disclosed in the aforesaid application.

In the drawings:

Figs. 7 and 8 are respectively a plan view and side elevation of another form of apparatus suitable for carrying out of my method of electrically welding tubing;

Fig. 9 is a diagram showing the electric and magnetic circuits established in the operation of the apparatus shown in Figs. 7 and 8;

Fig. 10 is a diagram showing the electric and magnetic circuits in the modification of the apparatus shown in Figs. 7 and 8;

Fig. 12 is a conventional view of an apparatus for preforming open-seam tube from flat skelp prior to welding.

Figure 1:
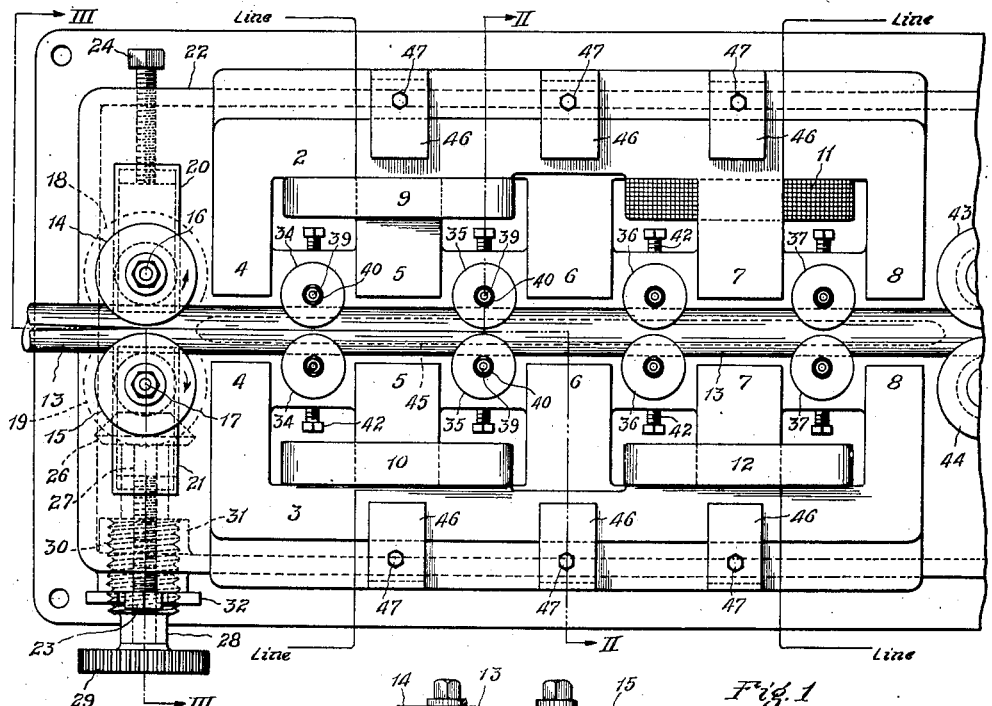
Figure 1 is a plan view of an apparatus suitable for carrying out my method of electrically welding tubing.
Figure 3:
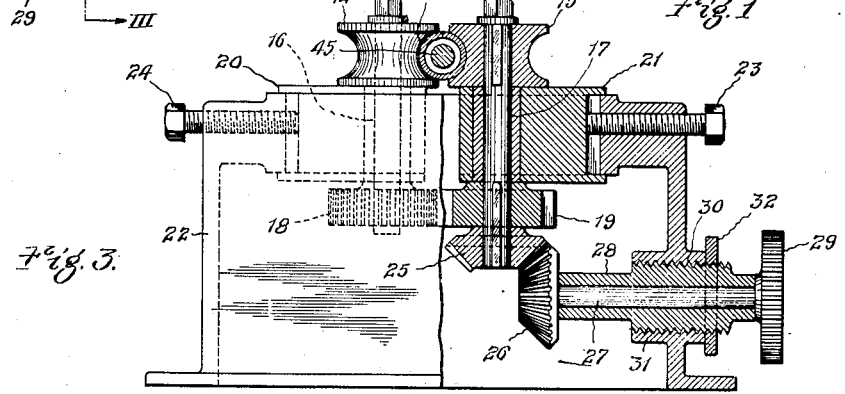
Fig. 3 is a section on line III—III of Fig. 1.
Figure 2:
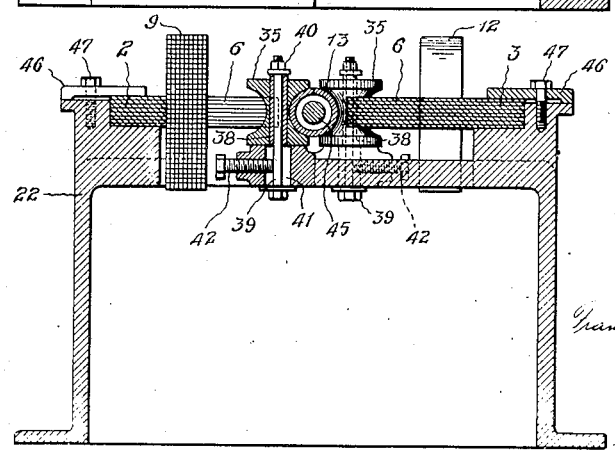
Fig. 2 is a section on line II—II of Fig. 1.
Figure 4:
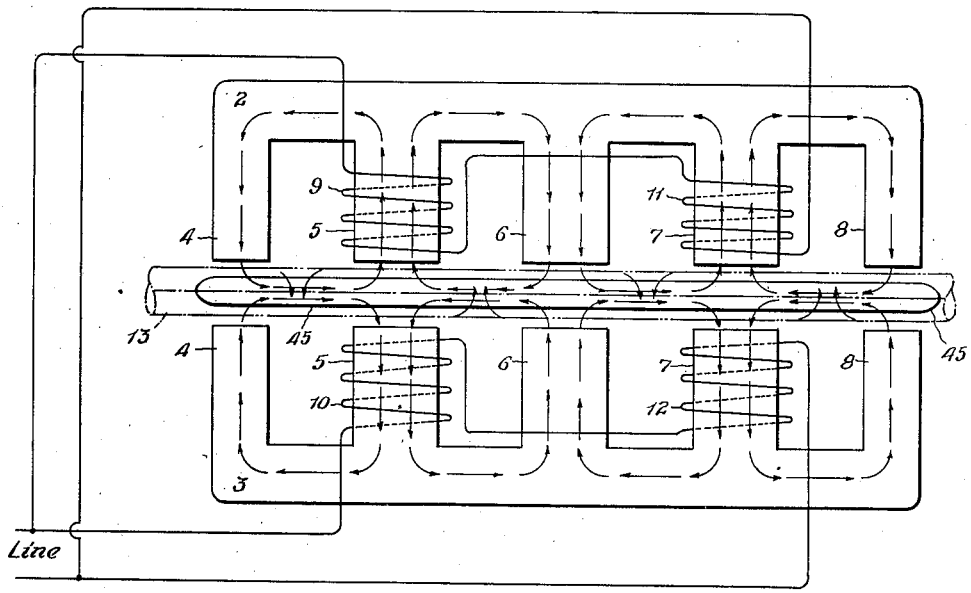
Fig. 4 is a diagram of the electric and magnetic circuits established in the operation of the apparatus shown in Figs. 1, 2 and 3.

Referring to Figs. 1, 2, 3 and 4 of the drawings, 1 represents a tube being welded in an apparatus which comprises a pair of laminated cores 2 and 3, each of which is provided with a series of poles, 4, 5, 6, 7 and 8. The cores 2 and 3 are disposed with the faces of their poles 4, 5, 6, 7 and 8, in spaced-apart abutting relation to each other. Electric coils, 9, 10, 11 and 12, are placed upon the pole extensions, 5, 5, and 7, 7. It is to be understood that all of the poles, 4, 5, 6, 7 and 8, may have electric coils placed upon them, but I prefer the arrangement shown in Figs. 1 and 2, in which the poles, 5 and 7, are salient poles and the poles, 4, 6 and 8, are consequent poles.

Through the space or opening between the poles of the laminated cores 2 and 3, the open seam close-butted tube, 13, is made to traverse longitudinally of the tube by suitable mechanism, which will be described, pressure being applied to the walls of the tubing to make the abutting edges of the seam closely contact with each other. At the same time that the tube is progressing through the space between the laminated pole pieces alternating electric current is passed through the electric coils, 9, 10, 11 and 12, setting up alternating fields of magnetism, portions of which pass through the wall of the tubing, 13, travel longitudinally through the space inclosed by the wall of the tubing and again pass through the wall of the tubing on their way to the next adjacent pole. These alternating lines of force induce electro-motive forces in the metal wall of the tubing which cause electric currents to flow circumferentially around the tube through the metal and across the seam thereof. These induced currents heat the contacting surfaces of the opposite faces of the seam to a welding temperature and cause them to fuse or weld together.

For feeding or traversing the tube through the alternating magnetic fields of force there may be provided feed-rolls such as shown at 14, 15, which may be driven by any suitable driving connection from a power device. In the drawings the rolls, 14 and 15, are shown mounted upon and keyed to vertical shafts or spindles, 16 and 17, which are geared together by long-toothed spur gears, 18 and 19. The spindles, 16 and 17, are revolubly mounted in adjustable bearings, 20 and 21, which are supported in adjustable relation to each other by the bed plate or frame, 22, of the apparatus. Bearings, 20 and 21 are constructed to slide in transverse slots or guides in the frame, 22, and means for adjusting the bearings and thereby adjusting the rollers, 14 and 15, is provided in the form of adjusting screws, 23 and 24. One of the feed roller spindles, 17, is extended below its spur gear, 19, and has mounted upon it and secured to it to rotate with it a bevel gear, 25, which meshes with a gear, 26, carried by the driving shaft, 27, which is revolubly mounted in the adjustable bearing, 28, and driven by a spur gear, 29. Only small transverse adjustments of the feed rolls, 14, and 15, are necessary and these adjustments are readily provided for by the long toothed gears, 18 and 19, in a well-known manner. In order that the bevel gears, 25 and 26, may mesh properly for any adjusted position of the spur gears, 18 and 19, bearing, 28, is adjustable in the wall of the frame, 22. The adjustment of bearing, 28, is accomplished by means of the screw thread connection, 30, between the bearing 28, and a suitable hub, 31, on the frame, 22. When the bearing, 28, has been properly adjusted it may be secured in position by means of the lock nut, 32, shown in Figs. 1 and 3.

To make pressure between the contacting surfaces of the seam there may be provided pairs of adjustable pressure rolls such as those shown at 34, 35, 36 and 37. Each of these rolls is revolubly mounted upon a stationary cylindrical sleeve or trunnion, 38, slightly longer in its axial dimension than the roller which is mounted upon it. A bolt, 39, passes through the sleeve, 38, and together with the nut, 40, secures the sleeve, 38, in the desired position for the proper adjustment of the pressure roll which it supports. The bolt, 39, passes through a slot, 41, in the frame, 22, of the apparatus so that it, together with the trunnion and pressure roll which it passes through may be secured in proper adjusted position. Set screws, 42, are provided for effecting adjustment of the pressure rolls.

Additional feed rolls may be provided as indicated at 43, 44, and more than one pair of feed rolls may be provided at either end of the apparatus. It will be understood that any other convenient means for traversing the tube through the apparatus may be used.

In order to increase the inductance of the circumferential electric circuit through the metal of the tube which, it will be observed, constitutes the secondary of a transformer or of a plurality of transformers, I may provide the armature or core, 45, of steel or iron to be inserted into the tube to extend past the faces of the poles, 4, 5, 6, 7 and 8. Means may be provided for holding the armature or core, 45, against longitudinal displacement, such means for instance, as shown in Figs. 5, 8, 9, 10 and 12, consisting of a bolt or rod secured to the core, running longitudinally through the tubing and anchored to some external anchor. I prefer, however, to provide no means for securing the core, 45, in the tubing being welded other than the magnetic fields set up by current in the electric coils, 9, 10, 11 and 12, in pole pieces, 4, 5, 6, 7 and 8, and the space between the poles through which the tube 13, progresses.

As the end of the unwelded tubing is fed through the feed rolls, 14 and 15, and enters the magnetic field of the pole pieces, 4, circumferential currents will be set up in the tubing to heat the metal of the contacting faces of the seam. As the tube progresses through the successive fields of alternating magnetic force other currents will be progressively induced in the metal of the tube to add to the heat imparted by the currents induced by the next preceding field. By providing a plurality of magnetic fields and causing the tube to pass successively through these magnetic fields in the manner described, the heating of the tube can be more economically and rapidly effected than where a single magnetic field is employed, and, consequently, the speed of travel of the tube through the apparatus, or, the speed of welding the tube may be much faster than is possible where a single magnetic field is employed. It will be understood by those skilled in the art that the electro-motive-force generated in the wall of the tubing tending to send electric current circumferentially through the metal of the wall of the tubing is proportional to the number per second of lines of magnetic force threaded through the electric circuit in which the electro-motive-force is generated, and that the current which will flow circumferentially around through the wall of the tubing and across the seam will be proportional to this electro-motive-force and inversely proportional to the resistance of the electric circuit. It is obvious that fewer lines of force can be made to pass through the space inclosed by a tube of small diameter than can be made to pass through a tube of relatively larger diameter. It is obvious, therefore, that the heating of the seam in a small tube will require more time than is required for a large tube. To overcome this difficulty in the matter of welding small tubes, and, further, to increase the speed of welding tubes of any diameter, I have provided a plurality of magnetic fields through which the tube progresses successively. By providing such a plurality of magnetic fields of force and causing the tube to pass progressively through them in succession the necessary temperature for welding tubing of any diameter may be attained, and the speed of travel of the tube through the welding apparatus may be increased with the number of magnetic fields provided.

For securing the magnet cores, 2, 3, to the frame, 22, clamps, 46, and bolts, 47, may be employed.

The frame, 22, is preferably made of brass or other non-magnetic metal as are also the pressure rollers, 34.

The pressure rollers perform another function besides that of making pressure in that through their arcs of contact upon the tube they reduce the electrical resistance of the secondary or welding circuit of which the wall of the tube forms a part. The electrical resistance of the seam will be greater than any other portion of the welding circuit and the greatest heating will, therefore, occur at the seam.

Figure 6:
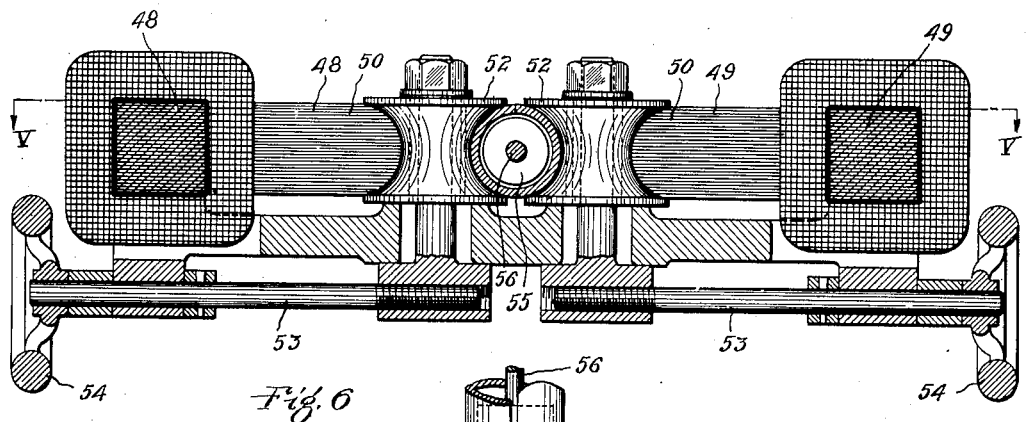
Fig. 6 is a section on line VI—VI of Fig. 5.
Figure 5:
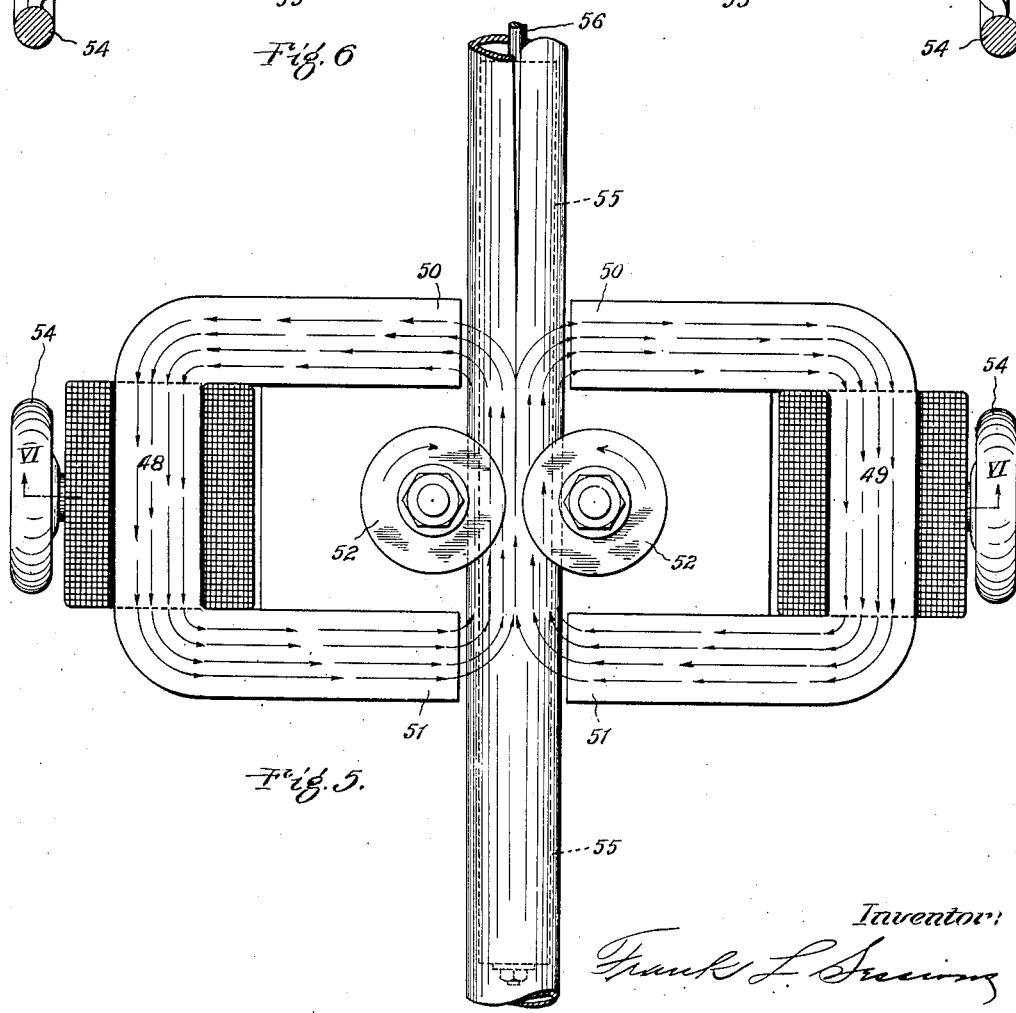
Fig. 5 is a plan view of another form of apparatus suitable for carrying out my method of electrically welding tubing.

In Figs. 5 and 6, there is shown an apparatus in which the magnet cores, 48, 49, are each provided with only two poles, 50 and 51. The electric coils; instead of being disposed upon the polar extensions of the cores are located upon the magnet yokes. A single pair of pressure rollers, 52, are employed, these pressure rollers being adjusted toward and from each other by means of adjusting screws, 53, and hand-wheels, 54. A core, 55, of magnetizable material is shown secured in position by the rod, 56, which may be anchored to any convenient external anchor, or the core, 55, may have no anchor but be held in position solely by the magnetic field between the poles, 50 and 51. Any convenient means may be provided for feeding or traversing the tube through the pressure rolls and the magnetic fields of the apparatus. In Figs. 7 and 8, are shown respectively a plan and a side elevation of an apparatus in which a single magnet core, 57, having a plurality of poles, is employed, it being mounted adjacent to one side of the tubing. Pressure rollers, or combined pressure and feed rollers, 58, 59, 60, 61, 62, and 63 may be employed for traversing the tubing through the magnetic fields and for pressing the edges of the tubing firmly together. A core of magnetizable material 64, may be employed within this tubing and may or may not be anchored by external means. It will be understood that any magnetizable core that is placed within the tube may be insulated from the wall of the tube, if desired.

In the form of apparatus shown in Figs. 7, 8 and 9, the electric coils, 65, 66, 67, 68 and 69 are shown wound upon the magnet yoke instead of upon the pole pieces. If desired, the seam to be welded instead of being at the top of the tube as it passes through the magnetic field may be at the side or bottom thereof. For instance, Fig. 7 might be properly referred to as a side elevation and Fig. 8, a plan view of an apparatus in which the tube was being fed through the magnetic fields with the seam of the tube at its side instead of at its top. Further, the position of the seam may be in the plane of the magnet poles, or it may be in any other plane, provided only that the opposite edges of the seam contact with each other.

Fig. 9 is a diagram of the electric and magnetic circuits of the apparatus shown in Figs. 7 and 8, the tubing, 70 being shown in dotted outline while the magnetizable core 64, is shown in full lines. The direction of the electric currents induced in the wall of the tubing are shown by the arrows, 71, 72, 73, 74 and 75.

Fig. 10 is a diagram of an apparatus in which two magnet cores, 76 and 77, similar to magnet core, 57, are used. In this case the poles of the magnet cores are disposed on opposite sides of the tube in a manner similar to those shown in the apparatus illustrated in Figs. 1, 2, 3 and 4.

Figure 11:
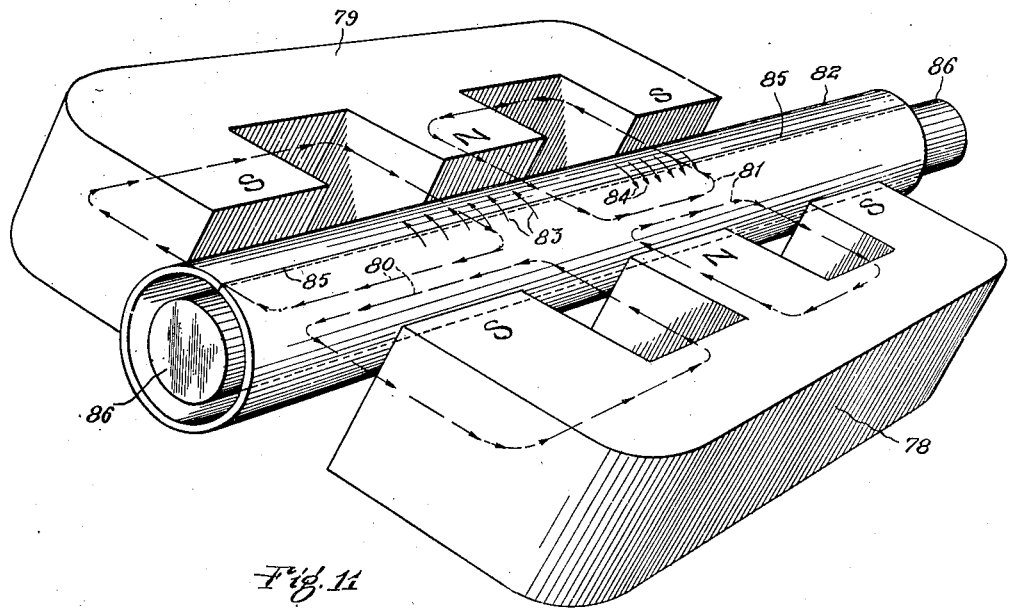
Fig. 11 is a perspective diagram showing the direction of currents induced in the metal of a tube being welded by my method.

Fig. 11 is a perspective diagram showing the magnetic circuits and induced electric currents in a tube which is being welded. Each of the magnet cores, 78 and 79, shown in Fig. 11 has three poles. To avoid confusion the electric coils are not shown upon the poles of the magnets. The polarities of the poles set up by a single alternation of current through the electric coils, which coils, it will be understood, are employed in the apparatus, are shown by the letters, N. S.

The directions of the lines of magnetic force are shown by the dotted lines, 80 and 81. The directions of the circumferential currents induced in the metal of the tube, 82, being welded are shown by the arrows, 83 and 84. The seam of the tube is shown at 85 and a magnetizable armature or core standing within the tube is shown at 86.

It will be understood that my method of and apparatus for welding tubing may be employed for welding tubing which has been previously rolled or drawn into unwelded or open-seam tubing in a separate machine, or, the apparatus for carrying out my method of welding may be incorporated in the same machine which forms the flat skelp into open-seam tubing.

In Fig. 12, I have shown conventionally a series of tube-forming rolls, 87, 88 and 89, in the operation of rolling the flat skelp, 90, into an open-seam tube, 91. Such an apparatus as I have shown in Figs. 1, 2 and 3, or, such as are shown in Figs. 5 and 6 may be employed to receive and weld the tubing, 91, as it emerges from the rolls, 92. A magnetizable core, 93, may be employed, and it may be anchored as shown at 94. In fact, the core, 93, may serve not only to reduce the reluctance of the magnetic circuit, but it may also serve as the mandrel upon which the tube, 91, is firmly rolled to the correct diameter, by the rollers, 92.

Having thus described my invention, I claim and desire to secure by Letters Patent:

1. The method of welding together the contacting surfaces of an open seam in metal, which consists of passing the metal successively through a plurality of fields of alternating magnetic force to cause alternating currents of electricity to be induced in the metal and to flow across said seam thereby heating the metal and welding said seam together.

2. The method of welding the contacting surfaces of an open seam in metal, which consists of passing the metal successively through a plurality of fields of alternating magnetic force to cause alternating currents of electricity to be induced in the metal and to flow across said seam thereby heating said surfaces to a welding temperature, and simultaneously applying pressure to said metal to cause the abutting surfaces of said seam to be pressed into contact with each other.

3. The method of welding tubing which consists of passing an open-seam tube, the opposite edges of the seam of which are in contact with each other, successively through a plurality of fields of alternating magnetic force to cause alternating currents of electricity to be induced in the metal of said tube and to flow across said seam thereby heating the tube and causing said seam to be welded together.

4. The method of welding tubing which consists of passing an open-seam tube successively through a plurality of fields of alternating magnetic force to cause alternating currents of electricity to flow across said seam thereby heating the contacting surfaces of said seam to a welding temperature, and simultaneously applying pressure to said tube to cause the abutting surfaces of said seam to be pressed into contact with each other.

5. In apparatus of the class described, an electric coil, means for transmitting alternating current therethrough and means for traversing a tube through the magnetic field set up by said current in said coil, said tube traversing only a portion of said magnetic field which is exterior to said coil.

6. In apparatus of the class described, a plurality of electric coils, means for transmitting alternating current through each of said coils, and means for traversing a tube successively through the magnetic fields set up by said current flowing in said coils, said tube traversing only portions of said fields which are exterior to said coils.

7. In apparatus for electrically welding tubing, means for exciting a plurality of fields of alternating magnetic force and means for feeding a tube successively through said fields of force.

8. In apparatus for electrically welding tubing, means for exciting a plurality of fields of alternating magnetic force, means for feeding an open-seam tube successively through said fields of force, and means for simultaneously applying pressure to said tube to cause the abutting surfaces of said seam to be pressed into contact with each other.

9. In apparatus for electrically welding the contacting surfaces of an open seam in metal, an electric coil, means for transmitting alternating current therethrough, and means for feeding a metal object through the magnetic field set up by said current in said coil, said metal object traversing only a portion of said magnetic field which is exterior to said coil.

10. In apparatus for electrically welding the contacting surfaces of an open seam in metal, an electric coil, means for transmitting alternating current therethrough, means for supporting the work outside of said coil in the magnetic field set up by said current in said coil and means for causing relative movement of the work and said magnetic field longitudinally of the seam being welded.

11. In apparatus for electrically welding the contacting surfaces of an open seam in metal, an electric coil, means for transmitting electric current therethrough, means for supporting the work outside of said coil in the magnetic field set up by said current in said coil and means for causing relative movement of the work and said magnetic field longitudinally of the seam being welded.

12. In apparatus of the class described, means for exciting a rapidly alternating field of magnetic force, means for supporting the work in said field outside of said exciting means, and means for causing progressive relative movement between said work and said field longitudinally of said work.

13. In apparatus of the class described a plurality of spaced apart magnet poles of alternately opposite, rapidly reversing polarity, and means for feeding the work past said pole faces parallel with itself and with said pole faces.

14. In apparatus for electrically welding the contacting surfaces of an open seam in metal, means for causing the metal adjacent to the seam being welded to be progressively traversed by a field of rapidly alternating magnetic lines of force, and means for simultaneously pressing said contacting surfaces together in said field of force.

15. In apparatus for electrically welding the contacting surfaces of an open seam in tubing, an electric coil, means for transmitting electric current through said coil, a magnetizable core for said coil having poles in close proximity to the tube to be welded, a magnetizable core in said tube, and means for feeding the tube to be welded progressively through the field of magnetic force of said coil.

16. In apparatus for electrically welding the contacting surfaces of an open seam in metal, a plurality of spaced apart magnet poles, means for supporting the work in the magnetic field adjacent to said poles, means for causing relative and progressive movement of the work and said magnetic field, and means for causing rapid reversals of magnetism in said magnetic field.

17. In apparatus for electrically welding the contacting surfaces of an open seam in metal, a plurality of spaced apart magnet poles, a magnetizable armature adjacent to but not in contact with said poles, and means for feeding the work through the space between said poles and said armature.

18. In apparatus for electrically welding close-butted, open-seam tubing to form electrically-welded, seamless tubing, a plurality of spaced apart magnet poles, a magnetizable armature adjacent to said poles, said armature being adapted to pass longitudinally through the tube being welded, and means for feeding a tube longitudinally of itself past said poles, over said armature.

19. In apparatus for electrically welding close-butted, open-seam tubing to form electrically-welded, seamless tubing, a plurality of spaced apart magnet poles, a magnetizable armature adjacent to said poles, said armature being adapted to pass longitudinally through the tube being welded, means for feeding a tube longitudinally of itself past said poles over said armature and means for simultaneously pressing the contacting surfaces of said seam together.

20. In apparatus for electrically welding close-butted, open-seam tubing to form electrically-welded, seamless tubing, a plurality of spaced apart magnet poles, means for feeding a tube longitudinally of itself past said poles and a pair of pressure rollers, one on either side of said tube in contact with said tube in the magnetic field of said poles.

21. In apparatus for electrically welding close-butted, open-seam tubing to form electrically-welded, seamless tubing, a plurality of spaced apart magnet poles, a magnetizable armature adjacent to said poles, said armature being adapted to pass longitudinally through the tube being welded, means for feeding a tube longitudinally of itself past said poles over said armature, and a pair of pressure rollers, one on either side of said tube adapted to press upon said tube to force the contacting surfaces of the seam thereof together.

22. In apparatus of the class described, a plurality of spaced apart magnetic poles of rapidly alternating polarity, means for feeding a tube longitudinally of itself successively past said poles and electrical conducting means electrically, circumferentially in parallel with said tube within the field of magnetic force emanating from said poles.

23. In apparatus of the class described, a plurality of spaced apart magnetic poles of rapidly alternating polarity, means for feeding a tube longitudinally of itself successively past said poles and a pair of pressure rolls of electrical conducting material one on either side of said tube in contact therewith within the field of magnetic force emanating from said poles.

24. In apparatus of the class described, a plurality of spaced apart magnetic poles of rapidly alternating polarity, means for feeding a tube longitudinally of itself successively past said poles, a pair of pressure rolls of electrically conducting material one on either side of said tube in contact therewith within the field of magnetic force emanating from said poles and means for varying the pressure between said tube and said rolls.

25. In apparatus of the class described, a plurality of spaced apart magnet poles of rapidly alternating polarity, means for feeding a tube longitudinally of itself successively past said poles, electrical conducting means electrically, circumferentially in parallel with said tube within the field of magnetic force emanating from said poles and means for varying the contact pressure between said electrical conducting means and said tube.

In testimony whereof I affix my signature.

FRANK L. SESSIONS.